United States Patent Office 3,011,657
Patented Dec. 5, 1961

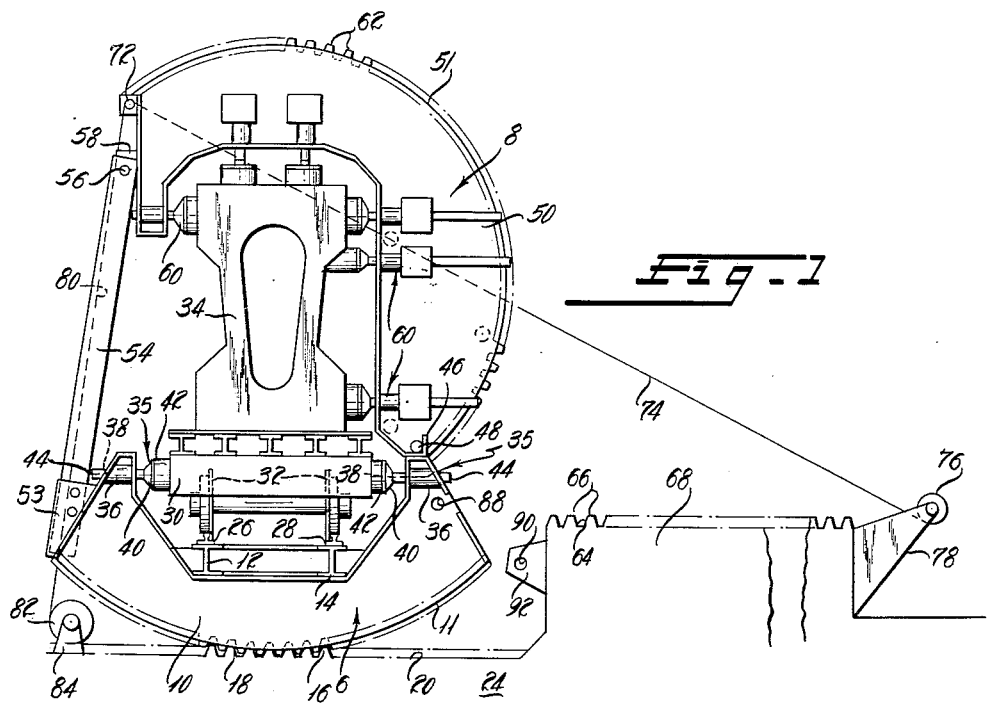
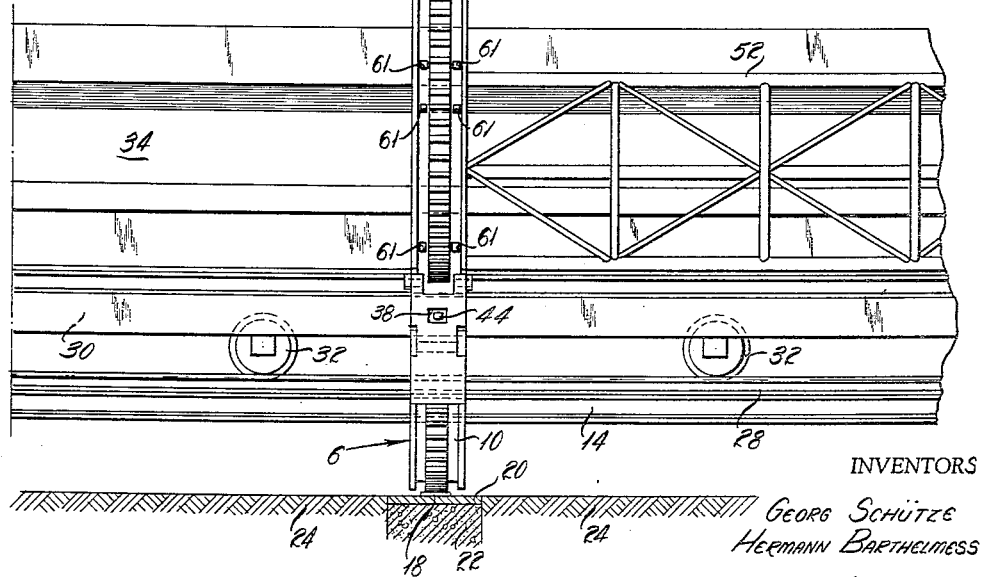

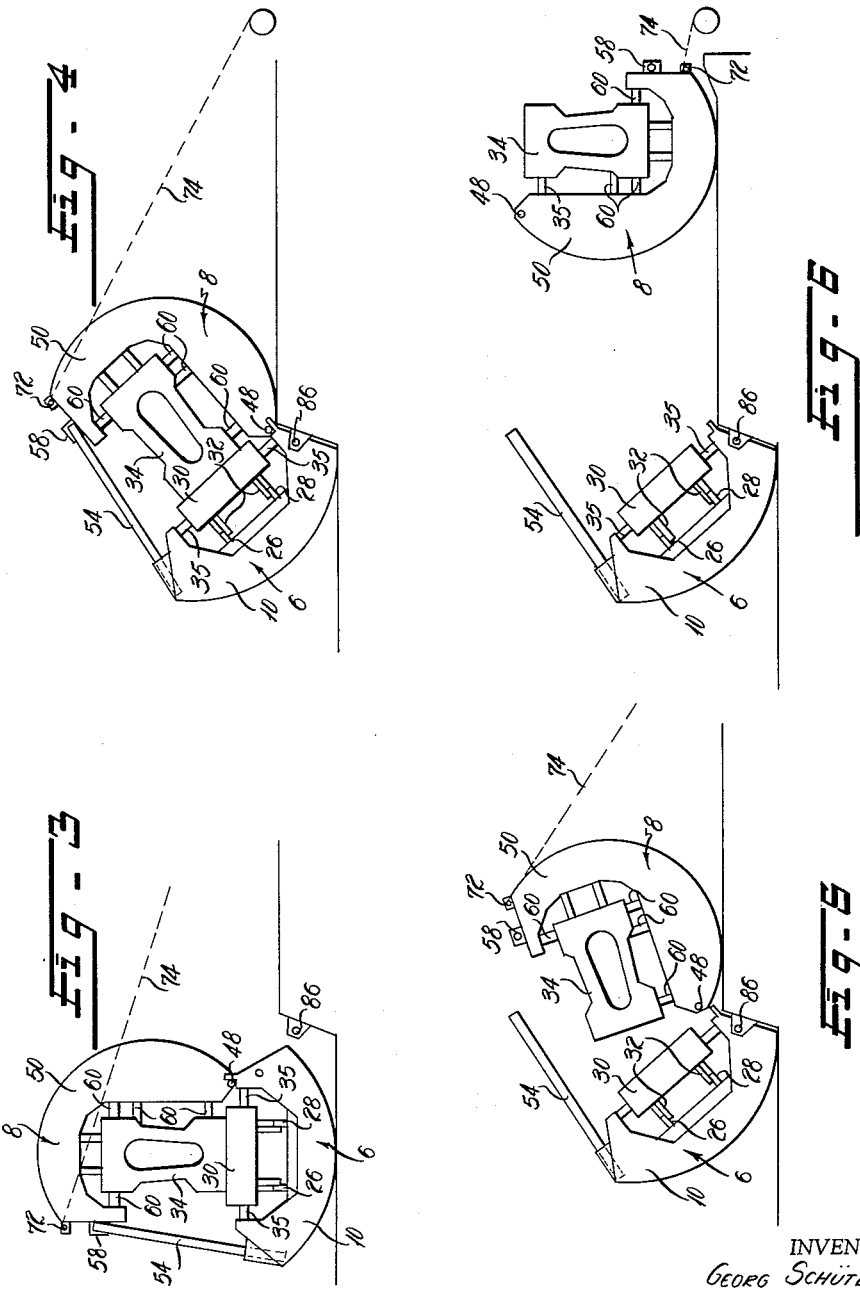

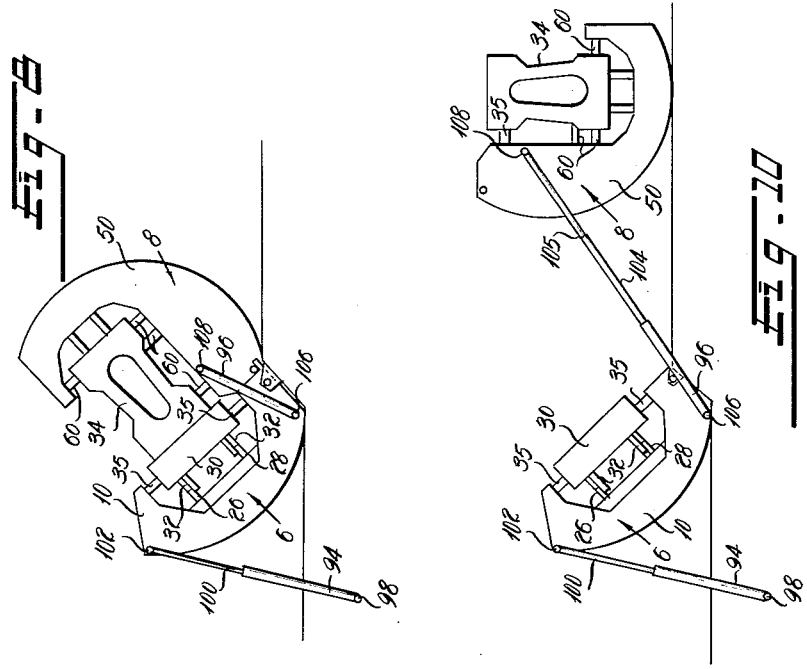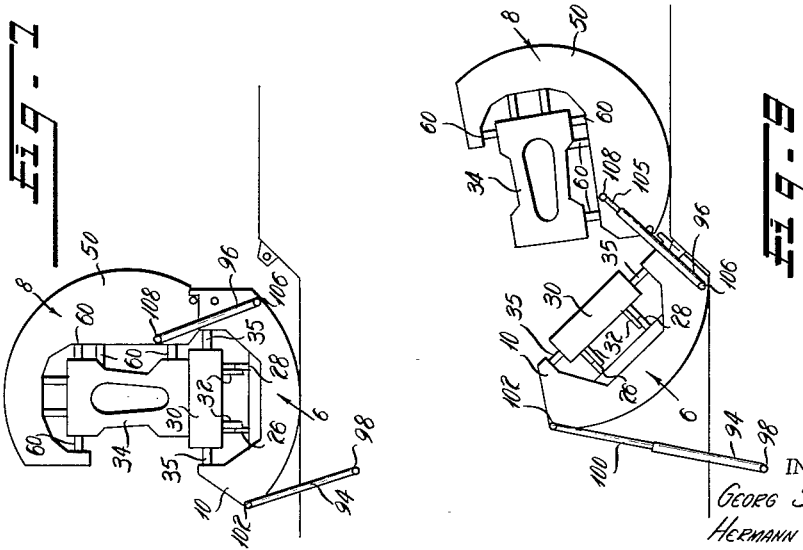

3,011,657
APPARATUS FOR INVERTING LONG AND HEAVY STRUCTURAL PARTS
George Schütze and Hermann Barthelmess, Koln-Bickendorf, Germany, assignors to Alweg Forschung G.m.b.H., Koln, Germany, a corporation of Germany
Filed Apr. 22, 1958, Ser. No. 730,109
Claims priority, application Germany May 2, 1957
6 Claims. (Cl. 214—1)

This invention relates to apparatus for inverting long, heavy structural parts, especially prefabricated concrete parts. Production techniques very often necessitate prefabrication of such parts, as for example track sections for monobeam railways, in an inverted position. Therefore, before assembling or use, such parts must be rotated 180 degrees around their longitudinal axis.

In the past devices have been used for this purpose in which the ends of the part to be rotated or inverted was clamped in rings borne in rollers. Those rings were connected to each other either by the part to be rotated itself or by means of a framework.

Those prior devices have many serious disadvantages. Due to the weight and the corresponding support pressure of the prefabricated part, excessive inner stresses are exerted on it when it is supported in the device at its outer ends. Therefore, only completely set concrete parts can be turned in such a device. This causes delays in the working process. Also the dimensions of those prior turning devices are unnecessarily large. Further, the part to be turned must be lifted from its transport vehicle before it is clamped in the device for the desired rotation.

It is the principal purpose and object of the present invention to provide an improved apparatus for inverting long and heavy structural parts, especially prefabricated concrete parts, said apparatus being structurally simple and lightweight and which is constructed to keep the forces necessary for turning as small as possible.

It is a further object to provide improved apparatus of this kind which permits the part to be turned to be shifted quickly and easily from its transport vehicle into the inverting apparatus and facilitates removal of the turned part out of the turning apparatus.

In attaining those objects and other objects the invention contemplates the provision of a novel turning apparatus which comprises two rockers, an upper and a lower one, separable from each other during the turning process and unrolling one after another on respective guiding tracks. The transport vehicle is clamped to the lower rocker whereas the part to be turned which initially rests on said vehicle is clamped to the upper rocker.

The advantages of the apparatus according to the present invention are that the parts to be turned can be clamped not only at their ends but also at the most favourable points between their ends as regards the inner stresses according to the support condition of said parts. Further the part to be turned during the turning process can be separated from the transport vehicle which itself is very heavy when adapted to transport heavy parts. Another advantage of the apparatus according to the present invention is the ease with which the turned part can be taken out of the opened rocker.

In order to avoid slipping of the rockers on their guide tracks during the turning process, preferably teeth are provided at the outer circumference of the rockers which during the unrolling of the rockers mesh with teeth of the respective guide tracks.

The turning apparatus can be operated mechanically by means of one or more cable winches, or by hydraulically or pneumatically operated pistons.

Also the clamping devices clamping the part to be turned and the transport vehicles to their respective rockers may be actuated either by means of spindles or by means of pressured oil or air devices.

Additional objects and advantages will become apparent as the description proceeds in connection with the accompanying drawings in which:

FIGURE 1 is a front view of the turning apparatus;
FIGURE 2 is a partial side elevation of FIGURE 1;
FIGURES 3 through 6 diagrammatically show the apparatus in four successive operation positions; and
FIGURES 7 through 10 are similar views showing a modified form of the invention.

Now referring more particularly to the drawings and more especially to FIGURES 1 and 2, the latter one showing only the left hand side of the apparatus it being understood the right hand side of the apparatus to be of identical construction, the apparatus comprises substantially a lower rocker 6 and an upper rocker 8. The lower rocker comprises at each end members 10 rigidly connected to each other by T-girders 12 and 14.

These lower front members 10 are of a rigid cast or welded construction and have a circular rim 11 which is provided with teeth 16, adapted to mesh with the teeth 18 of a guide track 20 mounted on a concrete foundation strip 22 in the ground 24.

Fixedly secured on top of the T-girders 12 and 14 are rails 26 and 28, respectively, which in the position shown in FIGURE 1 are in alignment with a rail track, not shown, leading from the prefabricating site to the apparatus. On this track the vehicle 30 preferably a flat car supported on flanged wheels 32 is run to the turning apparatus. Carried by this flat car is the part to be turned which in this case is the supporting beam section 34 of a monobeam railway. This beam section 34 has been prefabricated on this flat car 30 upside down and has been put into the apapratus resting on the flat car.

Clamping devices 35 comprise spindles 36 which are threaded through corresponding holes 38 provided in the lower front member 10 and which carry at their inner ends pressure plates 40 with hard rubber contact layers 42. The spindles 36 have squared heads 44 by means of which they can be actuated to clamp the flat car 30 rigidly to the lower front members 10.

The upper rocker 8 comprises a pair of upper end members 50 rigidly connected to each other by a frame work 52, as shown in FIGURE 2.

As shown in FIGURE 1 fixedly secured to the right hand side of the lower end member 10 is an open bearing 46 in which a bolt 48 secured to the upper end member 50 is supported. The upper end member 50 which also is a cast or welded structural part, has also a circular rim 51. Fixedly secured to a boss 53 integral with the lower end member 10 is a strut 54. At its upper end this strut 54 is connected by means of a removable bolt 56 to a boss 58 integral with the upper end member 50.

Clamping devices 60 comprising spindles, pressure plates and hard rubber layers identical to the clamping devices 35 described heretofore in connection with the lower end member 10 are provided at several points on the upper end members 50 to ensure a rigid clamping of the part 34 to the upper end members 50. Generally the heads of the spindles project into the squared perforations 61 in the end plate 50.

The outer rims 51 of the upper end members 50 are also provided with teeth 62.

In alignment with each of the upper end members 50 further guide tracks 64 having teeth 66 are mounted to concrete foundations 68, only one of those guide tracks being shown in FIGURE 1.

The foundations 68 are of such a height that the distance between the guide tracks 20 and 64 is the same as the distance between the adjacent teeth 16 and 62 of the corresponding rims of the upper and lower end members 10 and 50 respectively. Attached to one of the upper end members 50 is an eye 72 to which a cable 74 is secured.

This cable leads over a guide roller 76 rotatingly supported in a bracket 78 fixedly secured to the foundation on to a winch not shown, whereas a second cable 80 also secured to the eye 72 is guided over a guide roller 82 rotatably supported in a bracket 84 on to the winch. By means of this winch, which per se does not form part of this invention, the cable 74 is pulled so that the lower and the upper rockers together with the part to be turned are rocked on the curved rim portions of the lower end members 10 until the complete turning apparatus has been inclined about 45 degrees i.e. it has achieved the position shown in FIGURE 4. In this position the apparatus is locked by means of a bolt 86 pinned through the hole 88 (FIGURE 1) in the lower end member 10 and through a corresponding hole 90 in a bracket 92 secured to the foundation, the holes being in alignment with the apparatus in the position of FIGURE 4. Then the bolt 56 is removed and further pull on the cable 74 causes the upper rocker 8 to roll with the curved rim portions of its upper end members 50 along the guide tracks 64 in the manner as shown in FIGURE 5, until the upper rocker reaches the position shown in FIGURE 6, i.e., until the part to be inverted has been rotated by 180 degrees. The clamping devices 60 are loosened and the beam section 34 can be lifted by means of conventional hydraulic devices or the like.

During the inverting process the cables 74 and 80 are controlled by the winch in such a way that cable 74 is pulled and cable 80 is braked. When after removing the beam section 34 the turning apparatus is again brought into the initial position, as shown in FIGURE 3, for receiving another beam section, the cable 80 serves for pulling and the cable 74 for braking. This return movement of the apparatus takes place with the reverse steps as described above.

Preferably the cables 74 and 80 are provided at both sides of the rockers, which necessitates two winches, one at each side. In order to minimize the torsional stresses during the turning process it is advantageous to use synchronously operating winches.

FIGURE 7 shows diagrammatically in a self-explanatory manner the successive positions of a turning apparatus in which conventional one or multistage pull-draw cylinders 94 and 96 with double acting pistons have been utilized instead of the cable according to the embodiment shown in FIGURES 1 to 6.

Cylinder 94 is hinged as at 98 to the foundation whereas the piston rod 100 of this cylinder is hinged at 102 to the lower end member 10. Likewise the cylinder 96 with the two-stage pistons 104, 105 is hinged at 106 to the lower end member 10 and the end piston rod 105 to the upper end member 50 as at 108. First the cylinder 94 is operated until the lower rocker has reached the position shown in FIGURE 8 and then the cylinder 96 is operated until the position according to FIGURE 10 is reached.

Since during the turning process the rockers 6 and 8 are held in their corresponding position by those cylinders 94 and 96, the struts 54 together with the removable bolts 56 of the embodiment shown in FIGURES 1 to 6 can be dispensed with. The cylinders 94 and 96 may be operated either pneumatically or hydraulically.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for inverting long heavy structural members comprising first and second horizontal track sections, the second track section being disposed above and parallel to said first track section, a lower rocker assembly mounted for rocking movement on said first horizontal track section, rails on said lower rocker assembly extending normal to said tracks for supporting a flat car adapted to carry said structural member, an upper rocker assembly detachably mounted on said lower rocker assembly and adapted to be rockably supported on said second track section after it is detached from said lower rocker assembly, and clamping means for supporting said structural member solely from said upper rocker assembly after said upper rocker assembly is detached from said lower rocker assembly.

2. The apparatus according to claim 1 together with cables operatively connected to said upper and lower rocker assemblies, respectively, and a winch for operating said cables to rock said upper and lower rocker assemblies on the respective track sections.

3. The apparatus according to claim 1 together with fluid actuated cylinder-piston units operatively connected to said upper and lower rocker assemblies for rocking said assemblies on their respective track sections.

4. Apparatus for inverting long, heavy structural members comprising a lower rocker assembly mounted for rocking movement on a first horizontal track, means on said lower rocker assembly for clamping a support for said structural members, an upper rocker assembly pivotally and detachably mounted on said lower rocker assembly and adapted to be rockably supported on an elevated second horizontal track parallel to said first horizontal track, said upper rocker assembly being supported on said second track assembly after it is detached from said lower rocker assembly, and means on said upper rocker assembly for supporting said structural members after said upper rocker assembly has been detached from said lower rocker assembly.

5. Apparatus for inverting long, heavy structural members comprising first and second horizontal track sections, the second track section being elevated above and substantially parallel to said first track section, a lower rocker assembly mounted for rocking movement on said first horizontal track section, rails on said lower rocker assembly extending normal to said tracks for supporting a vehicle carrying said structural members, clamp assemblies carried by said lower rocker member for rigidly clamping said vehicle to said lower rocker member, an upper rocker assembly, means including an automatically detachable pivot mounting said upper rocker assembly on said lower rocker assembly, said upper rocker assembly being adapted to rockably be supported on said second track section after it is detached from said lower rocker assembly, clamping means on said upper rocker assembly for supporting said structural members within said upper rocker assembly, and means for rocking said upper and lower rocker assemblies as a unit through a predetermined arc and for thereafter rocking said upper rocker assembly independently of said lower rocker assembly to complete the inversion of said structural members.

6. The apparatus according to claim 5 together with means for retaining said lower rocker assembly in the position it occupies when the upper rocker assembly is detached from the lower rocker assembly.

References Cited in the file of this patent

UNITED STATES PATENTS

| | | |
|---|---|---|
| 1,440,888 | O'Donnel | Jan. 2, 1923 |
| 1,703,766 | Ellson | Feb. 26, 1929 |
| 2,769,557 | Ohr | Nov. 6, 1956 |
| 2,814,395 | Sahlin | Nov. 26, 1957 |

FOREIGN PATENTS

| | | |
|---|---|---|
| 250,695 | Great Britain | Apr. 22, 1926 |
| 293,145 | Great Britain | July 5, 1928 |
| 580,765 | France | Sept. 10, 1924 |